(12) United States Patent
Ikeda

(10) Patent No.: US 8,961,024 B2
(45) Date of Patent: Feb. 24, 2015

(54) CENTER BEARING SUPPORT

(71) Applicant: NOK Corporation, Tokyo (JP)

(72) Inventor: Masahiro Ikeda, Tottori (JP)

(73) Assignee: NOK Corporation (JP)

(*) Notice: Subject to any disclaimer, the term of this patent is extended or adjusted under 35 U.S.C. 154(b) by 48 days.

(21) Appl. No.: 13/728,307

(22) Filed: Dec. 27, 2012

(65) Prior Publication Data

US 2013/0287330 A1 Oct. 31, 2013

(30) Foreign Application Priority Data

Apr. 26, 2012 (JP) ................... 2012-100712

(51) Int. Cl.
| | |
|---|---|
| *F16C 27/00* | (2006.01) |
| *F16C 27/04* | (2006.01) |
| *F16C 27/06* | (2006.01) |
| *B60K 17/24* | (2006.01) |
| *F16F 1/38* | (2006.01) |
| *F16C 19/06* | (2006.01) |

(52) U.S. Cl.
CPC .............. *F16C 27/066* (2013.01); *B60K 17/24* (2013.01); *F16F 1/38* (2013.01); *F16C 19/06* (2013.01); *F16C 2240/60* (2013.01); *F16C 2326/06* (2013.01)
USPC .......................................... 384/536; 384/582

(58) Field of Classification Search
USPC .................................. 384/535, 536, 581, 582
See application file for complete search history.

(56) References Cited

U.S. PATENT DOCUMENTS

| | | | |
|---|---|---|---|
| 6,276,837 B1* | 8/2001 | Iwano ........................... | 384/536 |
| 6,948,857 B2* | 9/2005 | Schuetz ........................ | 384/536 |
| 7,922,394 B2* | 4/2011 | Hirakawa et al. ............. | 384/536 |
| 2002/0081050 A1* | 6/2002 | Cermak ........................ | 384/536 |
| 2011/0114815 A1* | 5/2011 | Valovick et al. .............. | 248/560 |

FOREIGN PATENT DOCUMENTS

JP 2001-280342 10/2001

* cited by examiner

*Primary Examiner* — James Pilkington
(74) *Attorney, Agent, or Firm* — Harness, Dickey & Pierce, P.L.C.

(57) ABSTRACT

A center bearing support (1) is provided which prevents a vibration absorbing function from being lowered on the basis of an increase of a dynamic spring constant by a resonance of an elastic body (13), at the time of an input of a vibration of a propeller shaft and a vibration. An inner periphery of an outer ring (11) fixed to a vehicle body side is provided with an inner ring (12) retaining a center bearing (2) via the elastic body (13) formed as a bent shape which is convex to one side in an axial direction and made of a rubber-like elastic material, the elastic body (13) has flexible portions (132, 133) in an inner diameter side and an outer diameter side than the bent portion (131) as a spring, and a resonance frequency thereof is equal to or more than 1500 Hz.

2 Claims, 2 Drawing Sheets

CENTER BEARING SUPPORT

BACKGROUND OF THE INVENTION

1. Field of the Invention

The present invention relates to a center bearing support which rotatably and elastically supports a propeller shaft of a motor vehicle to a vehicle body side via a center bearing and carries out a vibration absorption and a buffering.

2. Description of the Conventional Art

A center bearing support is structured such as to elastically support a center bearing which is installed to an outer periphery of a propeller shaft of a motor vehicle to a vehicle body side, and reduce a vibration transmission between the propeller shaft side and the vehicle body side under traveling.

As shown in FIG. 3, a center bearing support 100 of this kind has been conventionally provided with an outer ring 101, an inner ring 102 which is arranged in an inner periphery thereof and fitted to each other, and an elastic body 103 which is made of a rubber-like elastic material (a rubber material or a synthetic resin material having a rubber-like elasticity), elastically couples the outer ring 101 and the inner ring 102 and is formed as a bellow-like bent shape. The outer ring 101 is fitted and attached to a bracket which is attached to the vehicle body side and is not illustrated in the figure, and the inner ring 102 is fitted and attached to an outer race 201 of a center bearing 200 which is installed to an outer peripheral surface of an axial intermediate portion in the propeller shaft which is not illustrated in the figure.

The elastic body 103 is formed as a bent shape in such a manner that a cross sectional shape obtained by cutting off by a plane passing through an axis is convex to one side in an axial direction, whereby a degree of freedom for deformation is set to be large.

In other words, the center bearing support 100 is structured such as to elastically and rotatably support the propeller shaft to the vehicle body side via the center bearing 200, and in the case that any vibration is generated in the propeller shaft, the elastic body 103 repeatedly bends and stretches in conjunction with a relative eccentric motion between the inner ring 102 in the propeller shaft side and the outer ring 101 in the vehicle body side, whereby it is possible to effectively insulate the vibration transmission to the vehicle body side (refer, for example, to Japanese Unexamined Patent Publication No. 2001-280342).

SUMMARY OF THE INVENTION

Problem to be Solved by the Invention

However, according to the conventional center bearing support 100 mentioned above, since a bent portion 103a which is intermediate in a diametrical direction of the elastic body 103 has approximately the same thickness as a flexible portion 103b which is closer to an inner diameter side and a flexible portion 103c which is closer to an outer diameter side, a mass of the bent portion 103a becomes greater in some measure. Further, since a degree of freedom for deformation becomes larger due to the bent shape, as mentioned above, the elastic body 103 constructs a resonance system which employs the bent portion 103a as a mass, and employs the flexible portion 103b in the inner diameter side and the flexible portion 103c in the outer diameter side as a spring, and generates a resonance (surging), in the case that an input vibration comes to a normal frequency band (less than 1500 Hz, particularly between 600 and 1100 Hz). Accordingly, there is a problem that a dynamic spring constant of the elastic body 103 becomes higher in the frequency band mentioned above and a vibration absorbing function is deteriorated.

Further, since resonance frequencies of the constructing parts generally tend to overlap in the normal frequency band mentioned above, it has been hard to prevent the dynamic spring constant from being raised by the resonance in the normal frequency band, in the elastic body 103 having the conventional shape. The present invention is made by taking the point mentioned above into consideration, and a technical object of the present invention is to provide a center bearing support which prevents a vibration absorbing function from being lowered on the basis of an increase of a dynamic spring constant by a resonance of an elastic body, at the time of an input of a vibration of a propeller shaft and a vibration caused by an engine vibration.

Means for Solving the Problem

As means for effectively solving the technical object mentioned above, according to a first claim of the present invention, there is provided a center bearing support characterized in that an inner periphery of an outer ring fixed to a vehicle body side is provided with an inner ring retaining a center bearing via an elastic body formed as a bent shape which is convex to one side in an axial direction and made of a rubber-like elastic material, the elastic body has a bent portion which is intermediate in a diametrical direction as a mass, and has flexible portions in an inner diameter side and an outer diameter side than the bent portion as a spring, and a resonance frequency thereof is equal to or more than 1500 Hz.

According to the structure mentioned above, even if a vibration in a normal frequency band (less than 1500 Hz, particularly in the vicinity of 600 to 1100 Hz) generated by a rotation of a propeller shaft to be supported by the center bearing support or an engine vibration is input, a resonance in which the bent portion is set to the mass and the outer diameter portion and the inner diameter portion than the bent portion are set to the spring is not generated in the elastic body.

Further, according to a second claim of the present invention, there is provided a center bearing support characterized in that an inner periphery of an outer ring fixed to a vehicle body side is provided with an inner ring retaining a center bearing via an elastic body formed as a bent shape which is convex to one side in an axial direction and made of a rubber-like elastic material, the elastic body is formed in such a manner that a thickness is increased little by little from a bent portion which is intermediate in a diametrical direction toward both sides in the diametrical direction, a relationship $t1 < t2/2$ is established on the assumption that a thickness of the bent portion is t1, and a maximum thickness of the flexible portions in the inner diameter side and the outer diameter side than the bent portion is t2, and an inner angle formed by the flexible portion in the inner diameter side and the flexible portion in the outer diameter side with respect to the bent portion is larger than 50 degrees.

In other words, since the resonance frequency of the elastic body can be made equal to or more than 1500 Hz, in the same manner as the first claim, by constructing the elastic body as mentioned above, the resonance in which the bent portion is set to the mass, and the flexible portions are set to a spring in the inner diameter side and the outer diameter side than the bent portion is not generated in the elastic body, even if the vibration in the normal frequency band (less than 1500 Hz)

generated by the rotation of the propeller shaft to be supported by the center bearing support, and the engine vibration is input.

Effect of the Invention

On the basis of the center bearing support according to the present invention, since the elastic body is not resonated on the basis of the vibration input in the normal frequency band, it is possible to effectively prevent the vibration absorbing function from being lowered on the basis of the increase of the dynamic spring constant of the elastic body, at the time of the input of the vibration in the normal frequency band.

DETAILED DESCRIPTION OF PREFERRED EMBODIMENT

Figure 1:
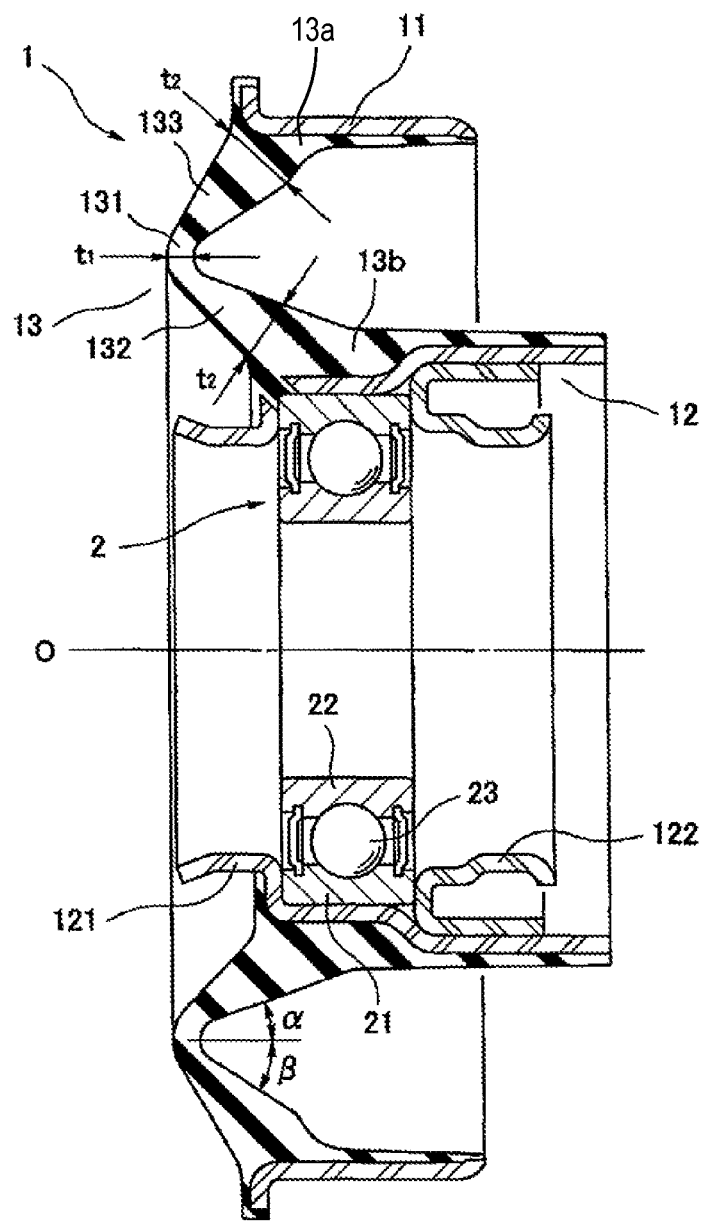
FIG. 1 is a cross sectional view showing a preferable embodiment of a center bearing support according to the present invention by cutting along a plane which passes through an axis O of a center bearing.

A description will be in detail given below of a center bearing support according to the present invention with reference to the accompanying drawings. FIG. 1 is a half cross sectional view showing a preferable embodiment of a center bearing support according to the present invention by cutting along a plane which passes through an axis of a center bearing.

A center bearing support 1 shown in FIG. 1 is constructed by an outer ring 11 which is pressed into and fitted to an inner peripheral surface of an annular bracket which is fixed to a vehicle body side via a mount or the like and is not illustrated, an inner ring 12 which is arranged in an inner periphery of the outer ring 11, and is fitted to a center bearing 2 rotatably supporting a propeller shaft (not shown) to be supported, and an elastic body 13 which elastically connects between the outer ring 11 and the inner ring 12.

Describing in detail, the outer ring 11 and the inner ring 12 are made of a metal such as a steel material, and the inner ring 12 among them is constructed by a first metal ring 121 and a second metal ring 122 in which outer diameter portions are integrated with each other by fitting, and is structured such that an outer race 31 of the center bearing 2 installed to an outer peripheral surface of the propeller shaft is fitted and retained between both the metal rings 121 and 122.

The elastic body 13 is formed by a rubber-like elastic material (a rubber material or a synthetic resin material having a rubber-like elasticity), is integrally vulcanization bonded at its outer peripheral end portion 13a to the outer ring 11, is integrally vulcanization bonded its inner peripheral end portion 13b to an outer peripheral surface of the first metal ring 121 in the inner ring 12, and is formed as a cross sectional shape which is bent so as to be convex to one side in an axial direction.

Further, the elastic body 13 is formed in such a manner that a thickness is increased little by little from a bent portion 131 which is intermediate in a diametrical direction toward both sides in a diametrical direction, and the following expression (1) is established on the assumption that a thickness of the bent portion 131 is set to t1 and a maximum thickness of a flexible portion (hereinafter, refer to as an inner diameter flexible portion) 132 in an inner diameter side than the bent portion 131 and a flexible portion (hereinafter, refer to as an outer diameter flexible portion) 133 in an outer diameter side is set to t2.

$$t1 < t2/2 \quad (1)$$

Further, on the assumption that an angle which the inner diameter flexible portion 132 of the elastic body 13 forms with respect to a virtual cylinder surface centering on an axis O is set to $\alpha$, and an angle which the outer diameter flexible portion 133 forms with respect to the virtual cylinder surface is set to $\beta$, the following expression (2) is established.

$$\alpha + \beta > 50 \text{ deg} \quad (2)$$

In other words, an inner angle formed by the inner diameter flexible portion 132 and the outer diameter flexible portion 133 with respect to the bent portion 131 is larger than 50 degrees.

The center bearing 2 is a known ball bearing which is constructed by an outer race 21 and an inner race 22 which are arranged concentrically with each other, and a lot of steel balls 23 which are rotatably retained therebetween at even intervals in a circumferential direction, and the steel balls 23, the outer race 21 and the inner race 22 are lubricated therebetween by a grease (not shown). In the center bearing 2, the outer race 21 is pressed into an inner peripheral surface in an intermediate portion in an axial direction of the first metal ring 121 in the inner ring 12, and is pinched by the first metal ring 121 and the second metal ring 122 from both sides in the axial direction, and the inner race 22 is fitted and fixed to an outer peripheral surface of the propeller shaft.

The center bearing support 1 provided with the above structure elastically and rotatably supports the propeller shaft to the vehicle body side via the center bearing 2. In the case that a vibration is generated in the rotating propeller shaft, the elastic body 13 bends and stretches repeatedly in conjunction with a relative eccentric motion of the inner ring 12 in the propeller shaft side and the outer ring 11 in the vehicle body side. Accordingly, it is possible to effectively insulate the vibration transmission to the vehicle body side.

In this case, a resonance frequency f in a diametrical direction of the elastic body 13 in which the bent portion 131 is set to a mass, and the inner diameter side flexible portion 132 and the outer diameter side flexible portion 133 are set to a spring can be expressed by the following expression (3), on the assumption that a mass of the bent portion 131 is set to m, a spring constant of the inner diameter side flexible portion 132 is set to k1, and a spring constant of the outer diameter side flexible portion 133 is set to k2.

Numerical expression 1

$$f = \frac{1}{2\pi}\sqrt{\frac{k_1 + k_2}{m}} \quad (3)$$

According to the illustrated embodiment, since the elastic body 13 is formed as a shape which satisfies the expression (1) and the expression (2) mentioned above, the mass of the bent portion 131 can be held down, and the spring constant k1 of the inner diameter side flexible portion 132 and the desired spring constant k2 of the outer diameter side flexible portion 133 can be secure. Therefore, it is possible to set a resonance frequency (a primary characteristic frequency mode) to a band which is equal to or more than 1500 Hz.

Figure 2:
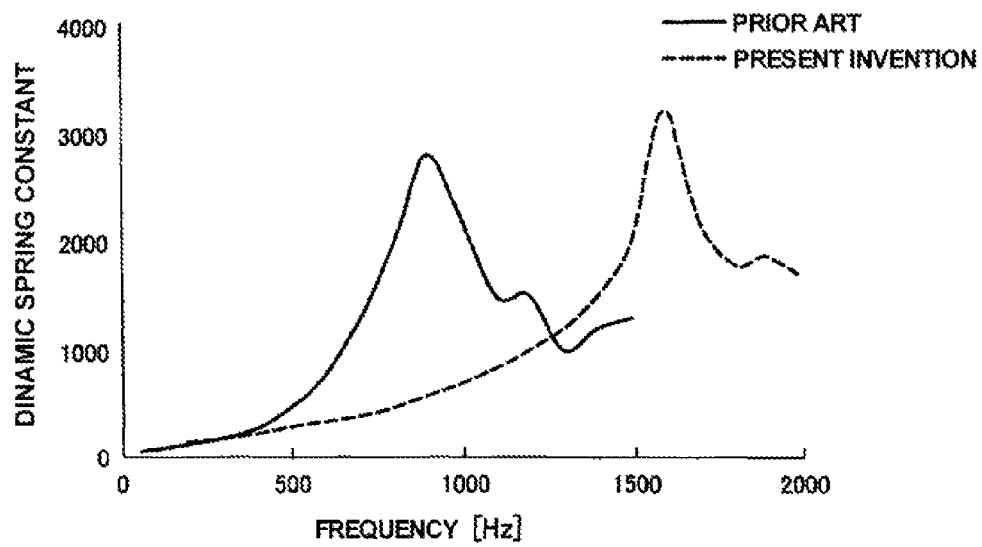
FIG. 2 is a characteristic diagram showing a relationship between a dynamic spring constant and a frequency in the center bearing support according to the present invention, in comparison with a conventional center bearing support.
Figure 3:
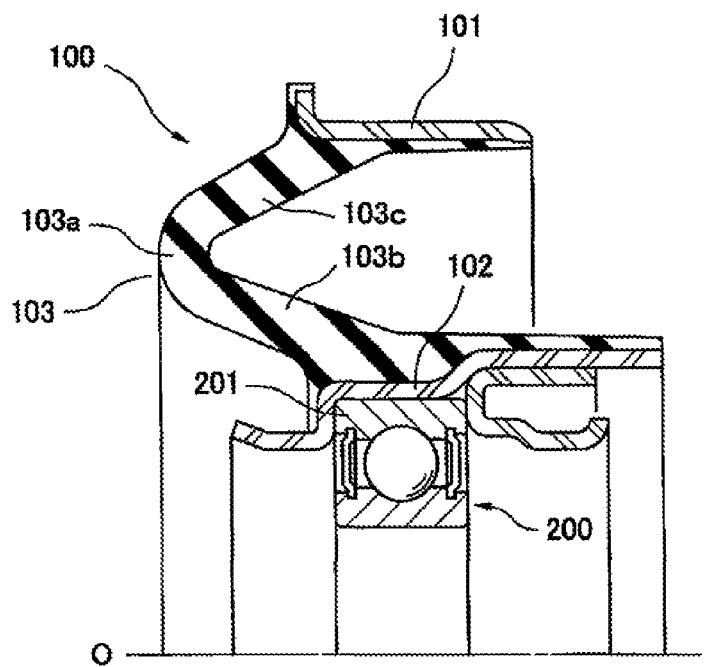
FIG. 3 is a half cross sectional view showing one example of the center bearing support according to the prior art by cutting along a plane which passes through an axis O of a center bearing.

Further, it has been known that the dynamic spring constant of the elastic body 13 becomes higher in the case that the resonance is generated in the elastic body 13. Conventionally, since the resonance frequency exists in the normal frequency band (less than 1500 Hz, particularly in the vicinity of 600 to 1100 Hz), the dynamic spring constant of the elastic body 13 becomes higher in the frequency band, such as a characteristic diagram shown by a solid line in FIG. 2, and there has been problem that the vibration absorbing function with respect to the vibration of the propeller shaft to be supported by the center bearing support 1 and the engine vibration is lowered. However, according to the structure mentioned above, since the elastic body 13 is formed as the shape which satisfies the expression (1) and the expression (2), the resonance frequency of the elastic body 13 is in the frequency band which is equal to or more than 1500 Hz, such as a characteristic diagram shown by a broken line in FIG. 2. Therefore, a good vibration absorbing function with respect to the vibration of the propeller shaft and the engine vibration can be secured.

Further, since the elastic body 13 is formed such that the thickness t1 of the bent portion 131 is small (2.5 mm as a particular example), and the thickness is increased little by little from there toward both sides in the diametrical direction, it is possible to sufficiently secure a degree of freedom for deformation in the diametrical direction and the axial direction.

What is claimed is:

1. A center bearing support comprising:
an outer ring fixed to a vehicle body;
an inner ring provided on an inner periphery of the outer ring, the inner ring retaining an outer race of a center bearing; and
an elastic body connected between the inner and outer rings, the elastic body having a bent shape which is convex to one side in an axial direction, an outer peripheral end portion connected to the outer ring, an inner peripheral end portion connected to the inner ring, and made of elastomeric material,
wherein said elastic body has an intermediate bent portion, a first flexible portion on an inner diameter side of the bent portion connecting the bent portion to the inner peripheral end portion, and a second flexible portion on an outer diameter side of the bent portion connecting the bent portion to the outer peripheral end portion, and
wherein an orthogonal cross-sectional thickness of the bent portion relative to a tangent of the bent portion is t1, a maximum orthogonal cross-sectional thickness of each of the first and second flexible portions relative to an extension direction of each of the first and second flexible portions is t2, and t1<t2/2.

2. A center bearing support comprising:
an outer ring fixed to a vehicle body;
an inner ring provided on an inner periphery of the outer ring, the inner ring retaining an outer race of a center bearing; and
an elastic body connected between the inner and outer rings, the elastic body having a bent shape which is convex to one side in an axial direction, an outer peripheral end portion connected to the outer ring, an inner peripheral end portion connected to the inner ring, and made of elastomeric material,
wherein said elastic body has a thickness that is tapered toward an intermediate bent portion from both a first flexible portion on an inner diameter side of the bent portion connecting the bent portion to the inner peripheral end portion and a second flexible portion on an outer diameter side of the bent portion in the diametrical direction connecting the bent portion to the outer peripheral end portion,
wherein an orthogonal cross-sectional thickness of said bent portion relative to a tangent of the bent portion is t1, a maximum orthogonal cross-sectional thickness of the first and second flexible portions respectively on the inner diameter side and the outer diameter side of the bent portion relative to an extension direction of each of the first and second flexible portions is t2, and t1<t2/2, and
wherein the first flexible portion forms an angle α with respect to a virtual axial cylinder surface centered on a rotational axis O of the center bearing, the second flexible portion forms an angle β with respect to the virtual axial cylinder surface, α and β are each less than 90 degrees, and α+β is larger than 50 degrees.

\* \* \* \* \*